(No Model.) 8 Sheets—Sheet 1.
W. A. DOBSON.
CASH REGISTER AND INDICATOR.
No. 535,198. Patented Mar. 5, 1895.

Witnesses:
Inventor:
Wm. A. Dobson,
by Chapin & Co.
Atty's (No Model.)  W. A. DOBSON.  8 Sheets—Sheet 2.
CASH REGISTER AND INDICATOR.

No. 535,198. Patented Mar. 5, 1895.

(No Model.) 8 Sheets—Sheet 3.
W. A. DOBSON.
CASH REGISTER AND INDICATOR.
No. 535,198. Patented Mar. 5, 1895.

(No Model.) 8 Sheets—Sheet 4.

W. A. DOBSON.
CASH REGISTER AND INDICATOR.

No. 535,198. Patented Mar. 5, 1895.

Witnesses:
J. N. Garfield
H. I. Clemons

Inventor:
Wm. A. Dobson
by Chapin & Co.
Attorneys (No Model.) 8 Sheets—Sheet 5.
W. A. DOBSON.
CASH REGISTER AND INDICATOR.
No. 535,198. Patented Mar. 5, 1895.

Witnesses:
J. R. Garfield
H. J. Clemons

Inventor
Wm. A. Dobson
by Chapin & Co
Attorneys (No Model.)  8 Sheets—Sheet 6.

W. A. DOBSON.
CASH REGISTER AND INDICATOR.

No. 535,198.  Patented Mar. 5, 1895.

Witnesses:

Inventor.
Wm. A. Dobson
by Chapin & Co.
Attorneys (No Model.) 8 Sheets—Sheet 7.

W. A. DOBSON.
CASH REGISTER AND INDICATOR.

No. 535,198. Patented Mar. 5, 1895.

Witnesses:
J. D. Garfield
H. J. Clemons

Inventor
Wm. A. Dobson.
by Chapin & Co.
Attorneys

THE NORRIS PETERS CO., PHOTO-LITHO., WASHINGTON, D. C.

(No Model.)   8 Sheets—Sheet 8.
W. A. DOBSON.
CASH REGISTER AND INDICATOR.
No. 535,198. Patented Mar. 5, 1895.
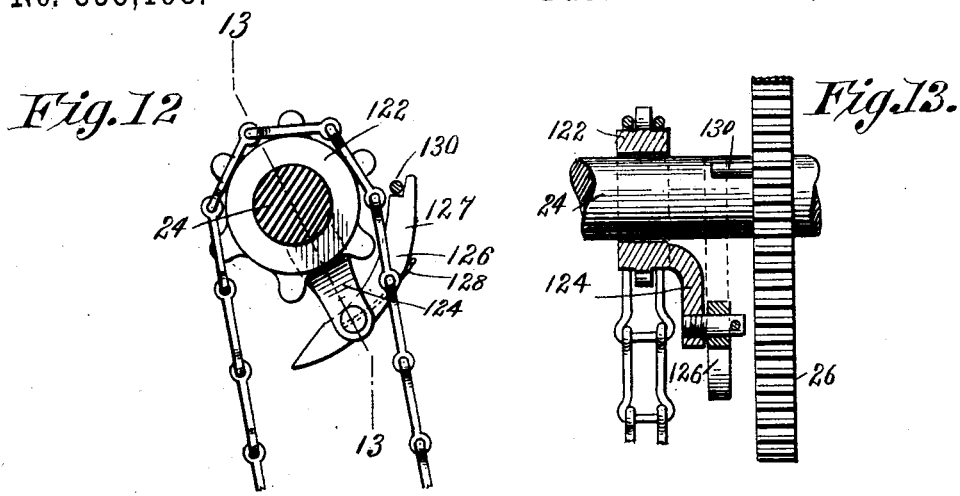
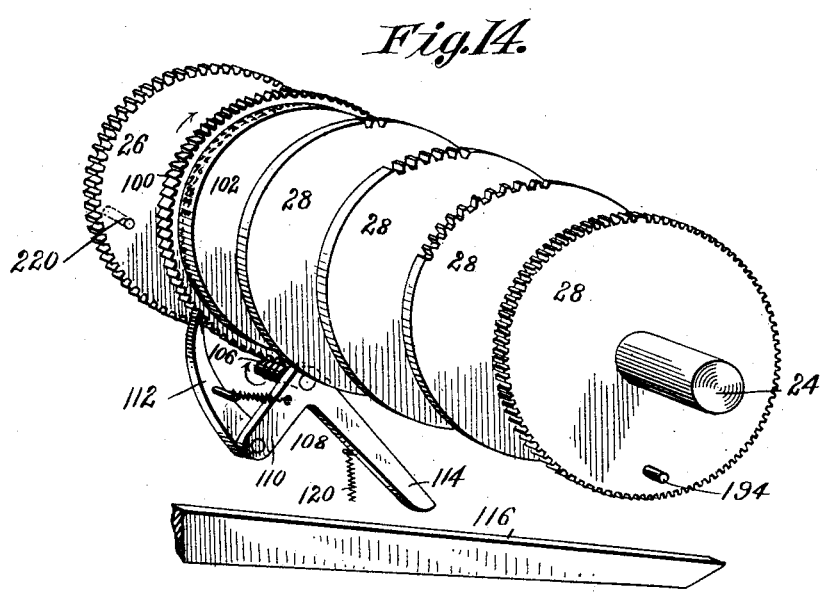
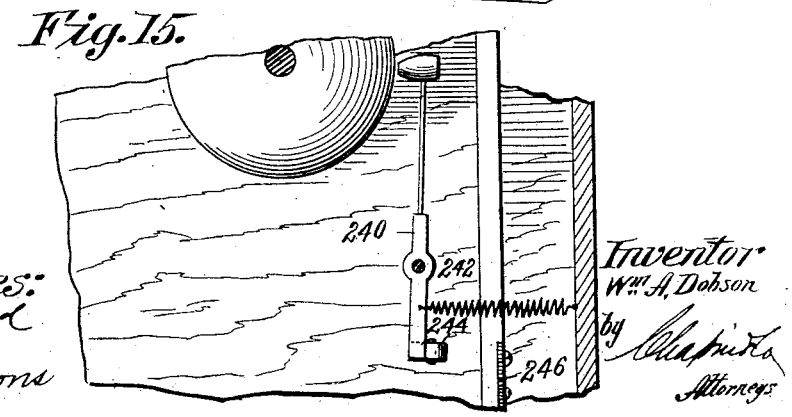

UNITED STATES PATENT OFFICE.

WILLIAM A. DOBSON, OF NORTHAMPTON, MASSACHUSETTS.

CASH REGISTER AND INDICATOR.

SPECIFICATION forming part of Letters Patent No. 535,198, dated March 5, 1895.

Application filed September 12, 1894. Serial No. 522,819. (No model.)

*To all whom it may concern:*

Be it known that I, WILLIAM A. DOBSON, a citizen of the United States, residing at Northampton, in the county of Hampshire and State of Massachusetts, have invented new and useful Improvements in Cash Registering and Indicating Machines, of which the following is a specification.

This invention principally relates, first, to electrically actuated mechanism for registering automatically on depression of a key the amounts of sales, receipts or disbursements, and the transmission of such registration to a common form of total adding or counting mechanism, which latter mechanism, however, forms no part of this invention; secondly, to electrically actuated and controlled key-replacing and register circuit closing mechanism; thirdly, to automatic devices for displaying and retiring from view the indicators or tablets, and the novel construction of same.

The invention also relates to drawer operating and bell ringing devices.

The invention consists in constructions and combinations of parts all substantially as will hereinafter fully appear and be set forth in the claims, reference being had to the accompanying drawings, in which—

Figure 1:
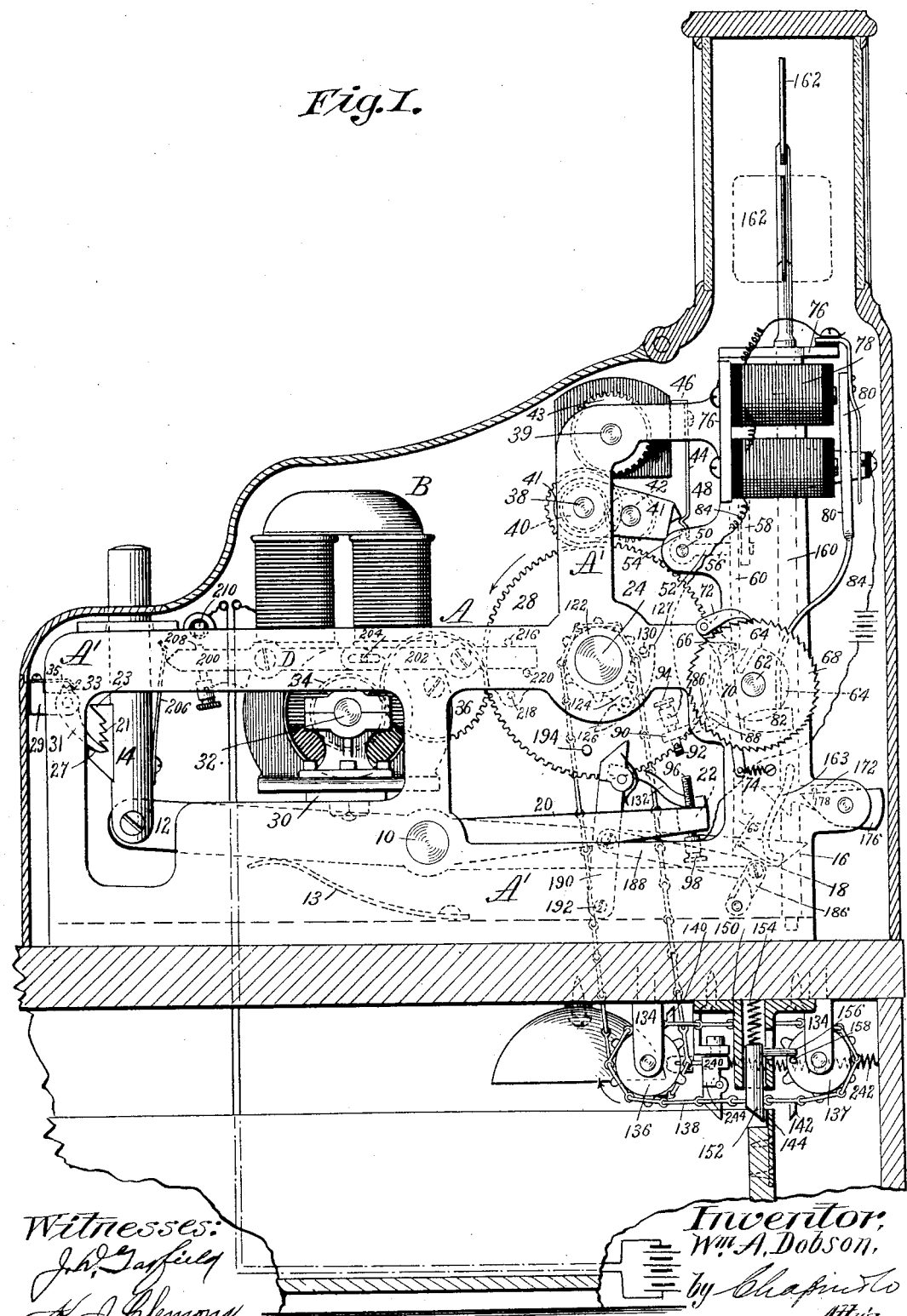
Figure 2:
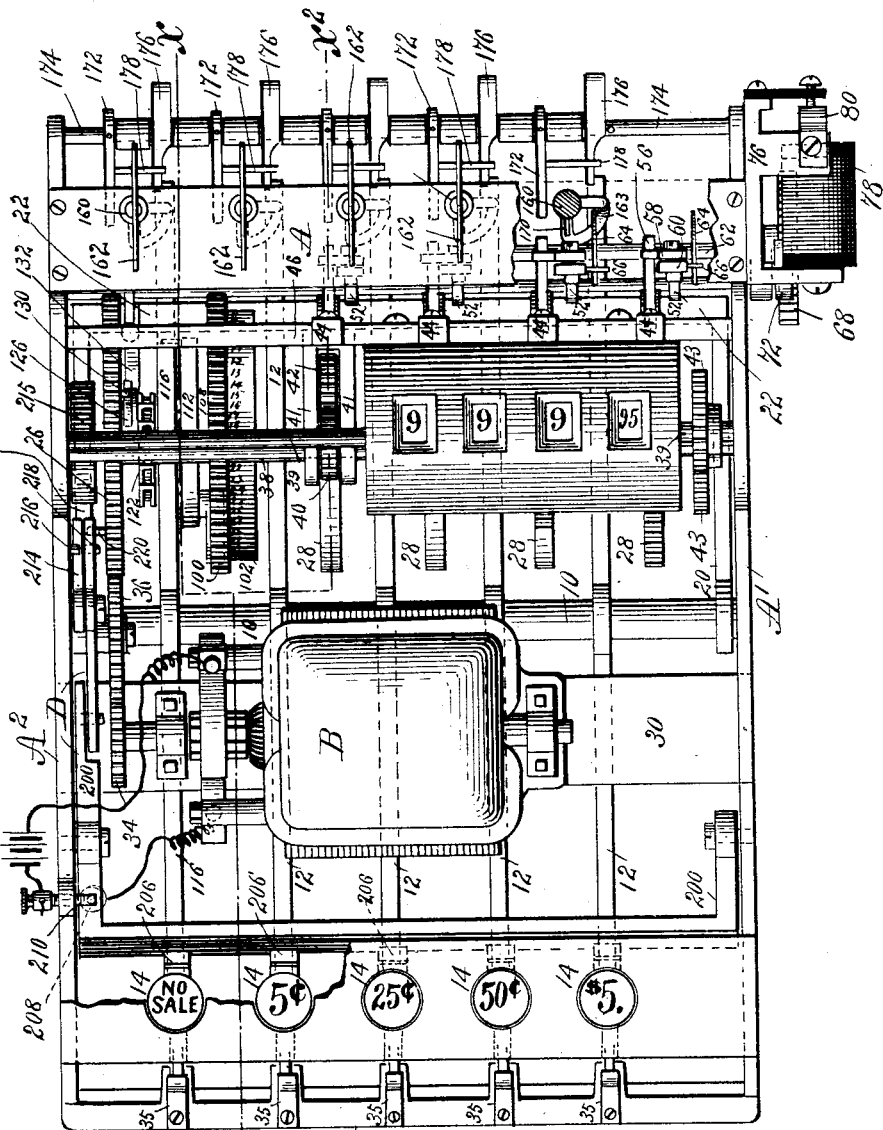
Figure 3:
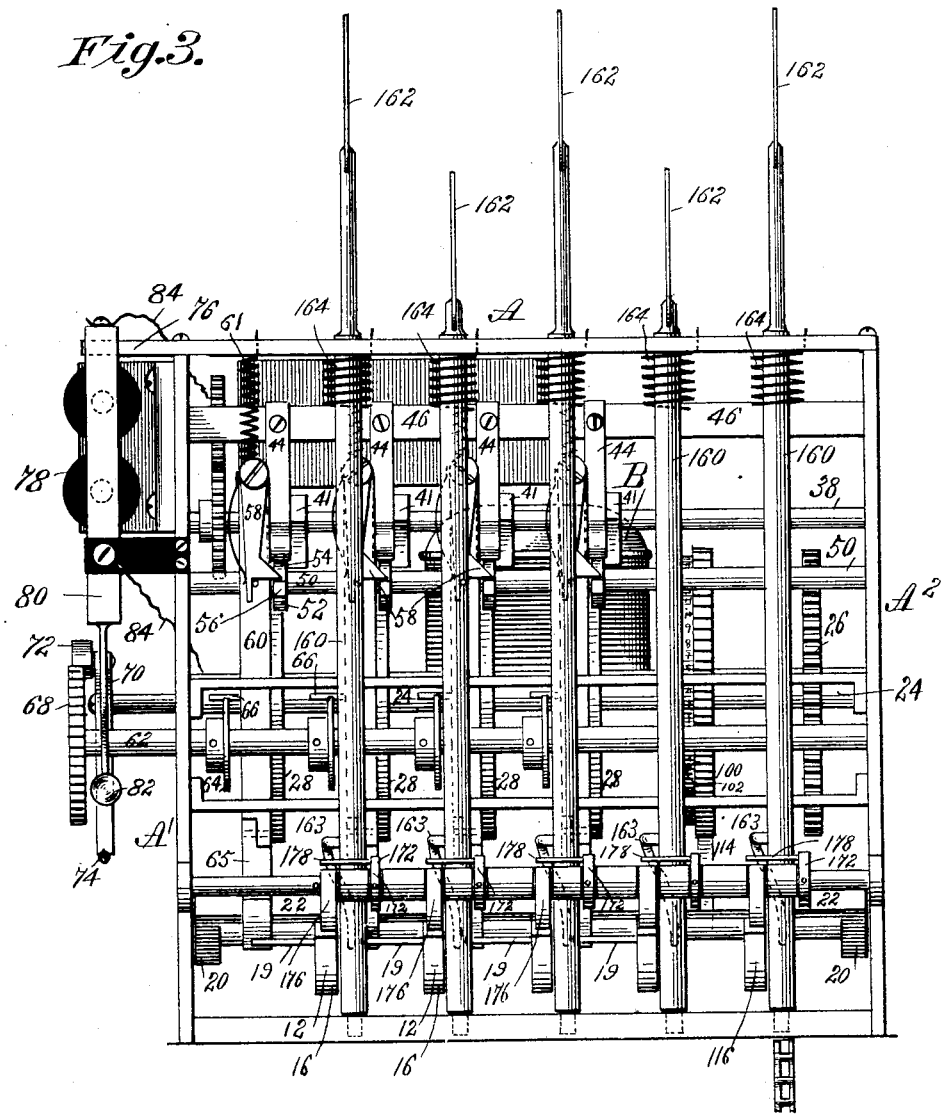
Figure 4:
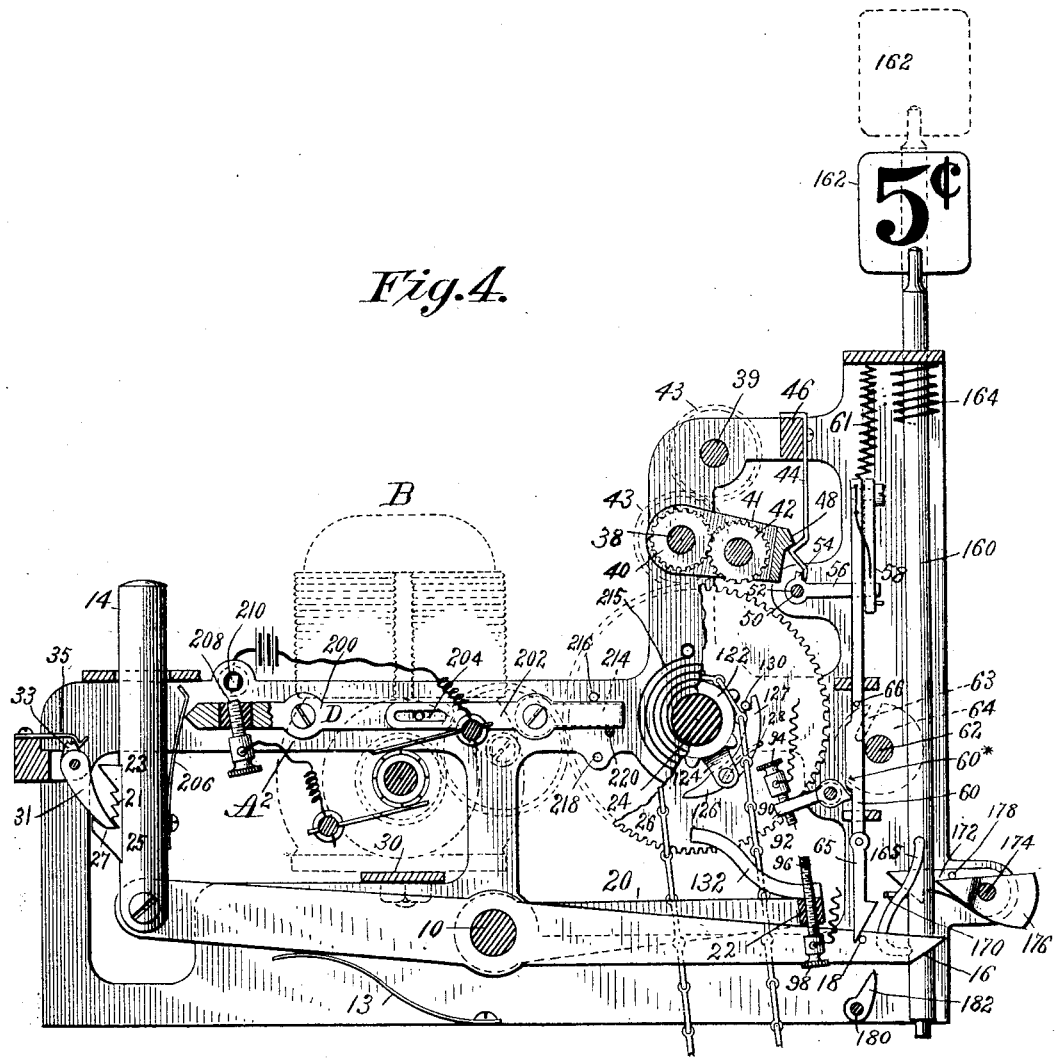
Figure 5:
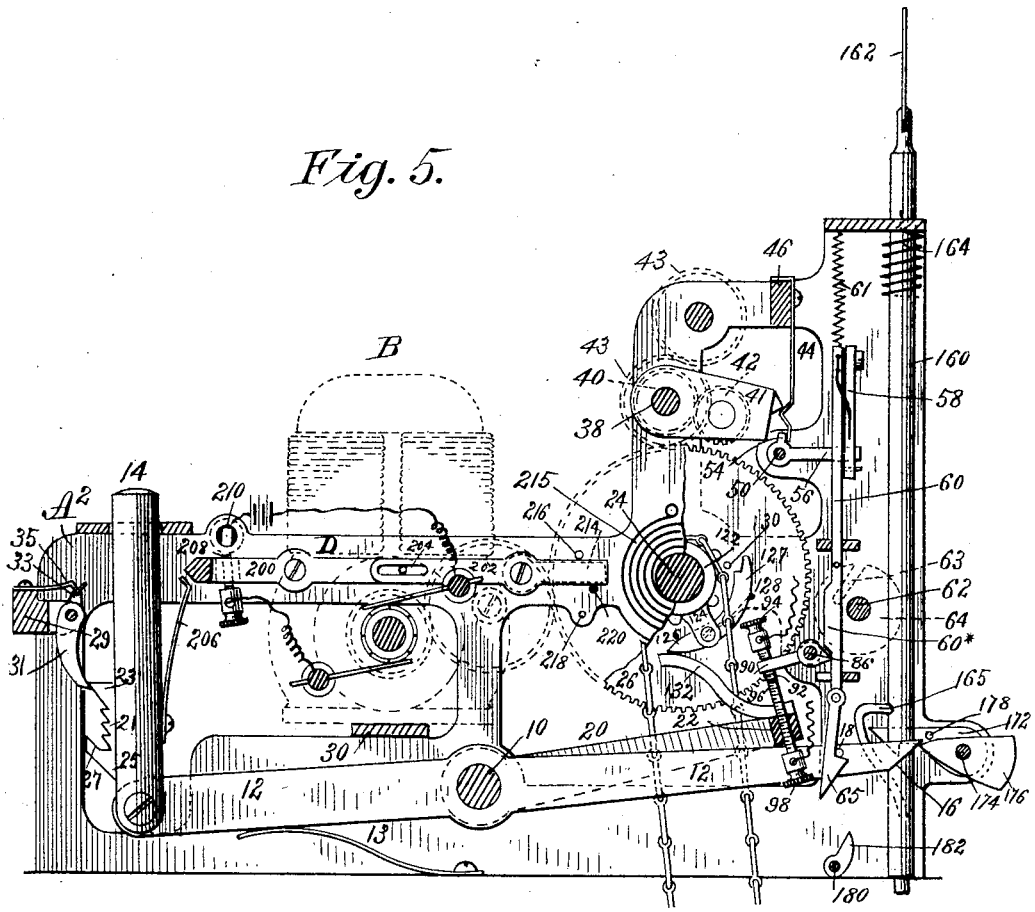
Figure 6:
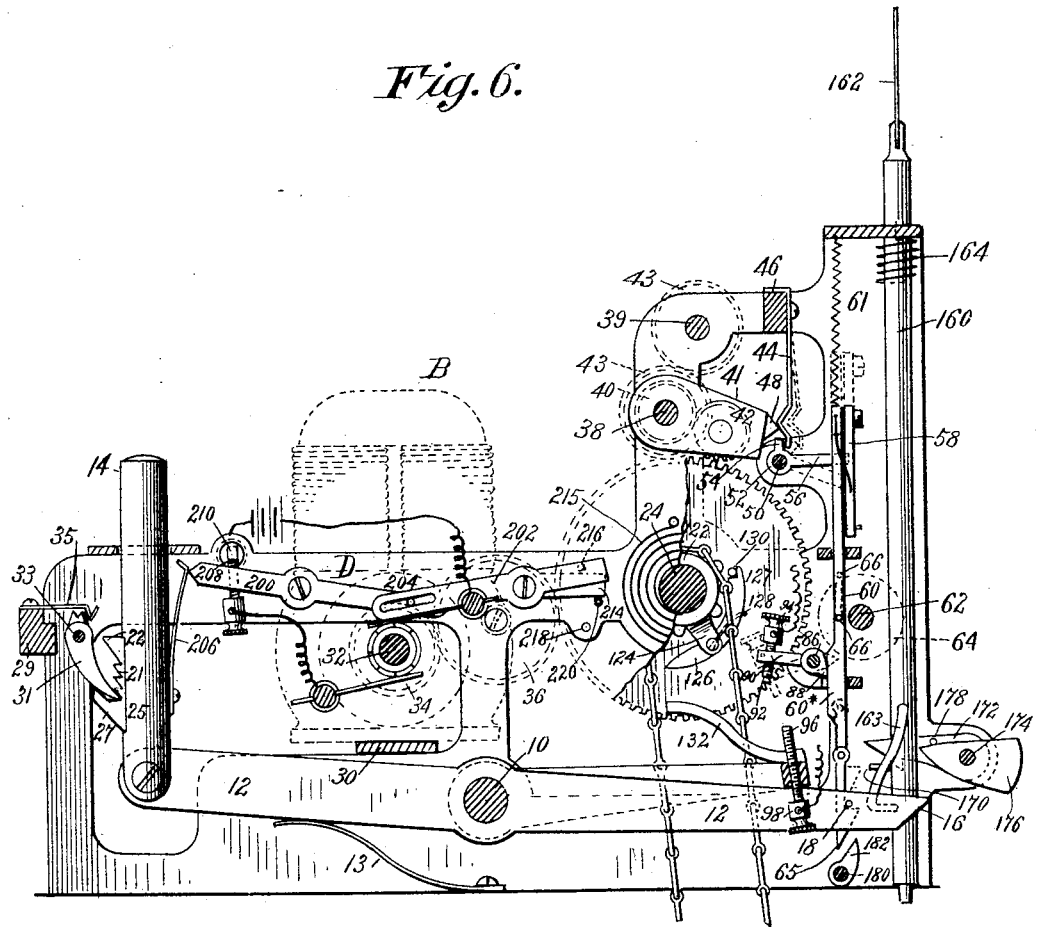
Figure 7:
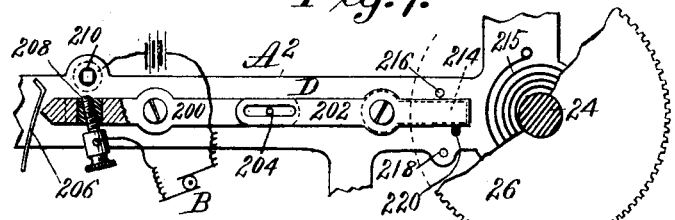
Figure 8:
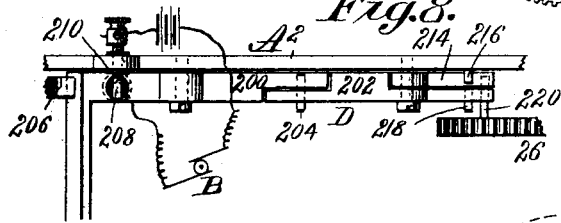
Figure 9:
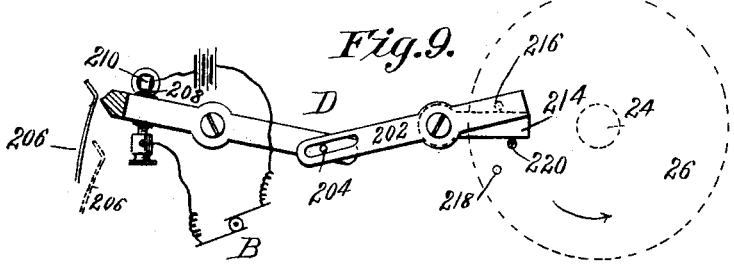

Figure 1 is a side elevation, the casing, cash drawer and parts of drawer-opening devices being in section. Fig. 2 is a plan view of the machine as removed from the case, and with some parts broken at the rear of the machine for clearer illustration. Fig. 3 is a rear elevation of the mechanism. Fig. 4 is a sectional elevation taken on line $x-x$, Fig. 2, certain of the parts at the rear, however, being shown as on line $x-x^2$, with the parts as in their normal positions. Fig. 5 is a view similar to Fig. 4, but illustrating the position of certain parts on the depression of a key. Fig. 6 is also a similar view to Fig. 4, but illustrating the position of parts on the replacement of a key. Figs. 7, 8, 9, 10 and 11 are detail illustrations of the compound switch levers, showing their positions at different stages of their operation to start or stop the electric motor. Figs. 12 and 13 are elevation views at right angles to each other showing the details of construction of the drawer-operating sprocket and connections. Fig. 14 is a perspective view of the register shaft with the register, "No sale," and driving gears shown in their relative positions. Fig. 15 is a view of part of the cash drawer and case, also showing the bell.

In the drawings, A represents the frame of the machine, consisting, preferably, of two metal castings, A', A², and having bearings for the various shafts. About midway from the rear of, and near the bottom edges of, the frames A and connecting the same, is located the key-lever shaft, 10, on which are pivoted the key-levers, 12, provided at the front of the machine with the key-posts, 14; and at the rear the extremities of the levers are beveled, as at 16, to form a suitable lifting point, and are also provided with the locking up pins, 18. On the same shaft is also pivoted the side arms, 20, of a U-shaped member, the cross-bar, 22, of which is common to, and rests upon, all the key-levers, 12, and is raised when any one of the key-levers is raised, and drops only when all the key-levers are down.

At a point above, and to the rear of, shaft, 10, is located the register-wheel shaft, 24, on which shaft is secured a driving gear, 26, and the registering wheels, 28. Of the latter there are as many as there are numbered keys, and they are all secured to, and revolve with, said shaft, 24. At a convenient point above the key-levers, 12, and to the front of the register wheels, 28, is located a small electric motor, B, which rests on a shelf, 30, extending between the side frames, A', A². On the motor-shaft, 32, is fixed a driving gear, 34, which connects through an intermediate gear, 36, with the driving-gear, 26, which is on registering-wheel shaft, 24.

On a shaft, 38, located above the register-wheel is a series of twenty-tooth pinions, 40, (one for each register wheel) each of which has held in mesh with it, and mounted in a stirrup, 41, pivoted on shaft, 38, another twenty-tooth pinion, 42, which is normally held up and out of mesh with the register wheel with which it corresponds, by a respectively provided spring detent, 44, supported on the cross-bar, 46, and which engages with an angular projection, 48, on stirrup, 41.

At a point below the detent, 44, is the fixed shaft, 50, on which is loosely mounted the series of L-shaped tripping levers, 52, each of which comprises the detent-holding-member, 54, and at right angles to it, the longer member, 56, which latter is operated upon to swing it down, (thereby swinging member, 54, toward the rear of machine) by the pivoted cam member, 58, connected at the upper portion of vertically sliding-bar, 60.

At a point to the rear of bar, 60, and about midway thereof, is located the disk-shaft, 62, on which, and in close proximity to the vertical bars, 60, are secured the slotted disks, 64, on the peripheries of which normally rest the supporting pins, 66, on bars, 60. At one end of this shaft, 62, and outside of the frame, A', is fixed a ratchet-wheel, 68. Between ratchet-wheel, 68, and the frame, A', and supported thereon is a swinging arm, 70, carrying on its upper end the pawl, 72, and provided at its lower end with the retracting spring, 74. On suitable supports, 76, on the frame, A', but insulated from any part of the machine, is the electro-magnetic vibrator, 78, of well known form, whose vibrating armature, 80, is continued or extended downward by a wire and has at its lower extremity a hammer, 82, which operates by a succession of rapid blows on pawl lever, 70, to ratchet shaft, 62, around on the closing of the vibrator circuit, 84.

At a point in front of and below shaft, 62, is a small shaft, 86, capable of partial rotation. On this shaft, 86, are secured the small levers, or dogs, 88, one of which is secured just in front of each bar, 60, and directly below and in line with a projection, 60*, on said bar, 60.

At any convenient point on the shaft, 86, is fixed a forwardly extending lever, 90, which is provided with a suitable insulated contact point, 92, and binding screw, 94, to form one pole of the vibrator circuit, 84, while at a point directly in line with point, 92, is a contact-point, 96, and binding screw, 98, located on the cross-bar, 22, of the before described pivoted U-shaped member, which constitutes the other pole of the vibrator circuit, 84.

Between the driving gear, 26, and the first registering gear of the series, is located a loose one-hundred toothed ratchet wheel, 100, having a cylindrical offset, 102, on the periphery of which are numbers from 1 to 100 arranged opposite the ratchet-teeth thereof. This is a counter, or indicator of "No sales." Directly under this ratchet-wheel, 100, and pivoted at 104 on a horizontal stud, 106, extending from the side frame, A, is an L-shaped lever, 108, the short arm, 110, of which has, pivoted, and held in spring engagement with ratchet-wheel, 100, a pawl, 112, while the long arm, 114, of the L-shaped lever, extends rearwardly and downwardly and just above a key-lever, 116, and at such a distance thereabove as to be moved, on the complete depression of the "No sale" key-lever, 116, upward, a sufficient distance to draw back the other arm, 110, and with it, pawl, 112, the distance of one ratchet-tooth of wheel, 100; and on the replacement of key-lever, 116, a spring, 120, attached to lever arm, 114, draws it downward and thus ratchets wheel 100 around one tooth.

On the register-wheel shaft, 24, between the "No sale" wheel, 100, and driving gear, 26, is located a sprocket-wheel, 122, which turns loose on a shaft, 24. Said sprocket-wheel is provided with an offset arm, 124, on which is pivoted a lever, 126, one arm, 127, of which lever is held by a spring, 128, in contact with a pin, 130, on driving gear, 26, while the other arm, which projects forward and downwardly is, on the raising of lever 20—22, struck by a forwardly and upwardly projecting arm, 132, fixed on the part, 22, of said lever, which engagement throws arm, 127, of lever, 126, out of the line of revolution of pin, 130.

At the rear of the case of the machine, and mounted in supports, 134, 134, on the under side of the table of the case, are two axially horizontal sprocket-wheels, 136, 137, one forward of the other, connected by an endless sprocket-chain, 138. Said chain is provided with two pins, 140, 142, which are adapted to engage a plate, or part, as 144, on rear of the cash drawer, 146, to move said drawer forward. On the same shaft with sprocket, 136, is a fixed duplicate sprocket-wheel which has a chain connection with the aforesaid sprocket-wheel, 122.

Mounted to vertically slide in a tube, 150, is a locking-bolt, 152, which is normally held down in front of the plate, 144, on the drawer, by a spring, 154, but which bolt is instantly raised out of engagement with said plate, 144, on the rotation of sprocket-wheel, 137, by the pin, 156, being raised within the slot in the tube by pin, 158, which stands outwardly beyond the side of the said sprocket-wheel, 137.

At the rear of the machine and arranged to one side of each of the key-levers, 12, is a series of vertical rods, 160, having at their upper ends numbered tablets, 162, which are arranged to normally stand edgewise to the front of the machine, and are held in such position by torsion springs, 164, attached to the top bar of the machine and to said bars. Near the lower end of each rod, 160, is a quarter-turn helical cam, 163, in this case constructed of helically bent wire, and in such a disposition relative to the rear end of the key-levers, 12, as to be engaged by them on their keys, 14, being depressed so as to rotate rods, 160, one quarter-turn, and thus bring numbered tablets, 162, into view from the front of the machine. On the front side of rods, 160, are provided pins, 170, which on the quarter rotation of said rods, 160, snap into engagement with hooks, 172, pinned to shaft, 174, preventing temporarily, the returning action of the torsion springs, 164, by detaining the bars, 160. Simultaneously with the action just described, the beveled point, 16, of key-lever, 12, strikes the forward end of lifters, 176, which are loosely pivoted on shaft, 174, and raise pin, 178, which project from the hooks, 172, over and across lifters, 176, and as each hook, 172, is pinned to shaft, 174, the raising of one lifter results in replacing or returning all the tablets which had been exposed, except at times the one corresponding to the one last key raised. When a key is fully depressed and the rear end of key-lever, 12, is raised to its full extent, a swinging spring-pressed hook, 65, which forms an extension of bar, 60, engages or hooks itself under a pin, 18, on key-lever, 12, thus holding said key-lever in a raised position.

On the front side of keys, 14, is provided a ratchet-rack, 21, the keys of which have an upward extent, the tooth, 23, at the top being of greater extent forwardly than the others, and the lowermost tooth, 25, has projecting in front of it a cam tooth, 27.

Mounted on a bar, 29, is, in front of each rack, 21, a swinging pawl, 31, having a notched lug, 33, on its upper side, which is adapted to be engaged by spring-detent, 35, and hold the pawl, 31, in spring contact with rack, 21, or to hold it away from, or out of, contact or engagement on return of a key, 14, to its normal position.

Below the rods, 60, and near the base of the machine, is a small rock-shaft, 180, rigidly secured on which are the knocking-off dogs, or short levers, 182, which serve at the proper time to displace the hooks, 65, from engagement with key-lever pins, 19. Near one end of their shaft and close to the outside of register-wheel of the series is a short lever, 186, which is connected by connecting rod, 188, with the jointed lever, 190, pivoted on the frame, A, at 192, and adapted to be operated on by pin, 194, on said register wheel.

On the frame, $A^2$, at a point opposite the motor, B, is a compound switch-lever, D, consisting of the two members, 200, and 202, and having the sliding connection, 204. The extremity of the lever, 200, at the front of the machine is beveled and adapted to be operated to raise it by the spring-lifter, 206, on key, 14. Near this beveled end is a contact point, 208, and binding-screw, forming one pole of the motor circuit, while just in line with, and above this is a lug on the frame, $A^2$, holding the other contact point, 210, and binding-screw forming the other pole of the motor circuit. At the rear end of the lever, 202, there is provided an auxiliary lever, 214, just above which and projecting from the frame, $A^2$, is the pin, 216, which pin extends only over the thickness of this auxiliary lever, 214. On a lug on the frame below this pin is another pin, 218, which is long enough to extend across both levers, 214 and 202. On the face of driving gear, 26, is a pin, 220, which is in extent long enough to reach across both levers, 214 and 202. Above shaft, 38, is located the total adder shaft, 39, which by the gears, 43 and 43, is connected with the transfer shaft, 38.

The total adding or counting device which I use in this machine does not differ materially from any of the well-known forms in which a complete revolution of a gear of one denomination turns one tooth of the next higher denomination, and so on.

The bell-ringing device consists, as shown in Figs. 1 and 15, of a lever, 240, pivoted on the under side of the machine table and normally held against the bell by a spring, 242. At the end of the short arm of the lever, 240, is a downwardly projecting jointed lever, 244, which engages a plate, 246, (Fig. 15) on the cash drawer upon the withdrawal of the latter and slipping off from said plate at a certain point rings the bell, but on return of the cash drawer, the jointed toe of the lever, 244, swings enough to allow plate, 246, to pass without effect under it.

Figure 10:
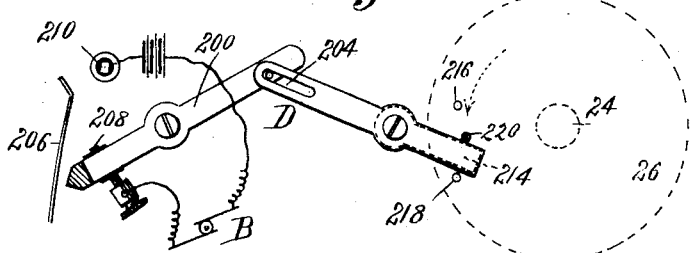
Figure 11:
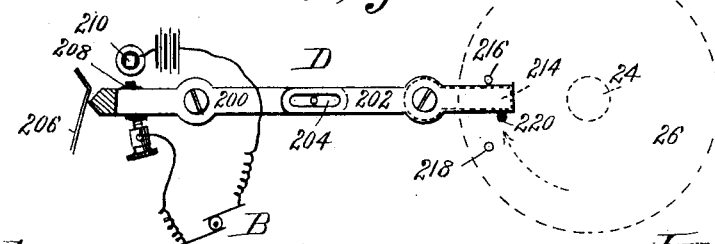

Describing the operation of the hereinbefore described mechanism, it will be assumed that two keys have been depressed and the rear ends of their corresponding key-levers, 12, are raised. (In Fig. 5 the position that various working parts of the machine assume on the depression of a key is illustrated, and by referring to Fig. 4 the normal position of the various parts before said key depression has taken place will be seen.) The beveled points, or extremities, 16, are shown as having engaged and lifted the point of the "lifters," 176, on shaft, 174, and thereby raised pin, 178, on hook, 172, which hook, being pinned to shaft, 174, acts to permit the replacement, by spring, 164, to their normal positions (as seen in Fig. 4) all tablets that may by a previous operation have been displayed, and at the same time a portion of the edge of key-lever, 12, opposite the vertical indicator-rod, 160, has engaged cam, 163, and rotated said rod one-quarter turn, thus bringing into view the tablets corresponding to the key, or keys, depressed, and the pins, 170, on rods, 160, having been engaged and hooked by the locking-hooks, 172, said tablets are restrained from assuming the normal position until another key is depressed for a new transaction. On reaching their highest raised positions, the key-levers, 12, are locked and held in such raised positions by the said locking-up pins, 18, being engaged and retained or held up by swinging spring hooks, 65, on vertical sliding-bars, 60. During the operation just described of depressing the keys, 14, the pawls, 31, which have been in engagement with the ratchet-teeth, 21, on key-post, 14, have acted to prevent any "pumping" and false registration thereby. On the raising of one or more key-levers, 12, the universal-bar, 20, 22, as heretofore described, is raised, and in such raised position brings the contact point, 96, on cross-bar, 22, against contact point, 92, on lever, 90, thus closing the vibrator circuit, 84, and instantly causing the disk-carrying shaft, 62, to be ratcheted around until the pin, 66, on bar, 60, has dropped from its raised position on the periphery of disk, 64, to the bottom of slot, 63. This immediately breaks the vibrator circuit, 84, by the vertical slide bar, 60 dropping (by the action of key-lever, 12, on hook, 65, of bar, 60, to draw it down against its spring, 61, by the greater power of key-lever spring, 13) and its cam portion 60*, forcing down one of the dogs, 88, on shaft, 86, which rotates or rocks said shaft, and in case of two keys having been depressed the operation just described still leaves one key-lever up, and with it the universal-bar, 22, which carries the contact point, 96. Thus the rotational movement of shaft, 86, which carries on it lever, 90, having contact point, 92, thereon, operates to lift said contact point, 92, away from the contact point, 96, and thus temporarily breaks the vibrator circuit. At this same instant the key-post, 14, of the replaced key, in going up has carried the spring motor-switch lifter, 206, against the front beveled end of the compound switch lever arm, 200, of the levers, D, and moved it up until the motor circuit contact-points, 208 and 210, are brought together. By referring to Fig. 9, it will be seen that the auxiliary lever, 214, is prevented from rising with lever arm, 202, by the pin, 216, on frame, A². As soon as the motor circuit is closed, as above described, whereupon the action of the motor is insured to rotate the register-wheels, 28, in the direction of the arrow, Fig. 9, the pin, 220, on driving-wheel, 26, is carried around one complete revolution, and in so doing strikes the upper side of both lever arms, 214, and 202, and carries them down as far as permitted by stop-pin, 218, on frame, A², as shown in Fig. 10, which, by the pin-and-slot connection at 204, carries lever, 200, down and breaks the motor circuit by separating the contact points, 208 and 210, at which time the coil reversing spring, 215, reverses the driving wheel, 26, and shaft, 24, and carrying-pin, 220, back to the position shown in Fig. 11, in which view it will be seen that the pin, 216, against which auxiliary lever, 214, rests, forms a stop for the whole lever, D, against the action of reversing spring, 215. During the reciprocatory revolution of the register shaft, 24, and its registering wheels, the taking-off gears, 40 and 42, belonging to the registering wheel of the key just replaced, as described, having been dropped down into mesh with said registering wheel, as insured by reason of the dropping of bar, 60, carry with it the tripping lever, 52, and thus releasing the stirrup projection, 48, from its detent, 44, the said taking-off gears, 40 and 42, are turned or revolved as many times as the number of teeth in the registering wheel with which they mesh, and the number of said teeth in the registering wheels are proportionate to the denominations of the key that operates them, i. e., the five-cent key operates a registering wheel of only one tooth; the twenty-five-cent wheel one of five-teeth; the fifty-cent wheel one of ten teeth and the five-dollar wheel one of one hundred teeth, as will be plain on reference to Fig. 14.

It is arranged that the taking-off pinions, 40 and 42, have twenty teeth, as the wheels of the counting or total adding device have each ten teeth, except the units wheel, which has twenty teeth, as the lowest denomination registered by this machine is five cents. One revolution of the one-toothed register wheel turns the taking-off wheel one-twentieth of a revolution (one complete revolution of wheels, 40, 42, of course equaling twenty five-cent registrations, or one dollar, at which point one tooth of the next or ten-toothed wheel in the total adding counter is turned, registering one dollar). One revolution of the five-toothed registering wheel turns the taking-off wheels, 40, 42, one-quarter of a turn. One revolution of the ten-toothed registering wheel turns wheels, 40, 42, one-half a turn. One revolution of the one-hundred-toothed registering wheel turns wheels, 40, 42, five times, or five dollars on the total adding counter. The total adding counter registers on the first wheel five-cent amounts up to a dollar, and from that wheel one dollar at a time up to nine dollars, from that ten dollars at a time up to ninety dollars, and from that ninety dollars at a time up to nine hundred dollars.

On the rotational movement of a registering wheel, 28, its corresponding twenty-toothed wheel, 42, falls into mesh behind the first tooth of the series, be it a one or a one hundred toothed wheel, and having run in mesh with all of the number of teeth provided in its registering wheel, it is, on reaching a dead or a blank place on its registering wheel, by said blank, or untoothed portion of the registering wheel raised out of mesh at once, and is caught and held up in such position by detent, 44. The tripping lever, 52, after being carried down by cam member, 58, on bar, 60, slips off from said member, 58, before the end of the drop of bar, 60, thus replacing spring detent just above projection, 48, so that on wheel, 42, being thrown out of mesh by a blank place on register wheel, as described, it is caught and held up as stated, by the detent, 44. As fast as the amount indicated by any key depressed has been registered and transferred to the counter, the pin, 194, on the outside or one-hundred-toothed registering wheel, has, on the spring reversal of said registering wheel, operated the knock-off dogs, 182, to raise into its normal position by its spring, 61, the bar, 60, thus replacing the cam member, 58, in position above the tripping lever arm, 56, all ready to again operate thereon. When the key-levers of the depressed keys are raised, and with them the universal bar, 20, 22, the forwardly extending member, 132, thereon is brought into engagement with, and acts to swing, lever, 126, on arm, 124, and carry the end, 127, out of line of rotation of pin, 130, on driving gear, 26, so that as long as one key-lever remains raised, no engagement or operation of the drawer sprocket is possible, but immediately on the replacement and dropping of the last key of those depressed, the member, 132, on universal bar, 22, is dropped with it, and the spring, 128, returns the lever arm, 127, again into line of rotation of pin, 130, and the motor circuit being closed, and the register shaft and wheels being rotated for the last taking-off operation, carries the loose sprocket-wheel, 122, around with it, and rotates by the chain connections the drawer opening sprockets, 136 and 137, and one of the pins, 140, or 142, on chain, 138, engages the rear side of plate, 144, on cash drawer; and the bolt, 152, having been drawn, the drawer is moved out a sufficient distance to enable the operator to easily draw it out the remaining distance necessary. When the cash drawer is pushed back into place, the bolt, 152, is raised by its cam face, 153, permitting drawer-plate, 144, to pass under it. The pins, 140 and 142, never interfere with the return of the drawer, as they always stop in the positions shown in Fig. 1.

Coincident with the operation just described, by which the cash drawer is operated, the drawer-plate, 246, engages, in moving forward, with the downwardly extending and jointed member, 244, ringing the bell, as previously described.

On the spring reversal of the register-wheel shaft, 24, and connection described, which occurs after the motor circuit has been broken, the motor armature and shaft may be turned backward by the reversing spring.

The source of electrical supply for the motor and vibrator circuits used, as described, may be, of course, either from a battery, dynamo, public line wires, or from any convenient source, and if from a special battery or dynamo, they may, of course, be located at any convenient distance from the cash register.

Although there has been no attempt to illustrate or describe the manner of doing so, it will be obvious that certain parts of the machine, the total adding or counting mechanism, for instance, may be separated from, and located at a distance from, the key and indicator mechanisms.

Having thus described my invention, what I claim, and desire to secure by Letters Patent, is—

1. In a cash registering and indicating machine, the combination with the rotatably mounted indicator-stems having the helical cams, 163, pins, 170, and torsion-springs, 164, of the rock-shaft, 174, having the series of hooked members, 172, mounted to swing thereon, each with the projection, 178, the arms, or lifters, 176, on said rock-shaft to engage the projections, 178, and the key-levers having their swinging movements for sidewise impingement against said helical cams, and having engagements with said lifters, substantially as described and shown.

2. In a cash registering machine, the combination with one or more key-levers each with the stud, 18, and the universal bar having the contact member, 96, of the disk-shaft having a disk, 64, with the slot, 63, the vertical slide-bar, 60, having the jointed hook member, 65, at its lower end, and provided with the pin, 66, and cam, 60*, the rock-shaft, 86, having a lever, one portion or arm of which is subject to impingement by the said cam, 60*, and its other arm comprising the contact, 92, an electric circuit comprising said contacts, 96, 92, and an electro magnetic vibrator which, on the closing of the circuit, becomes operative to rotate the disk-shaft, substantially as described.

3. In a cash registering machine, the combination with one or more key-levers each with the stud, 18, and the universal bar having the contact member, 96, of the disk-shaft having a disk, 64, with the slot, 63, the vertical-slide-bar, 60, having the jointed hook-member, 65, at its lower end and provided with the pin, 66, and cam, 60*, and also provided with the pawl, 58, and having the elevating spring, 61, the register-wheel shaft having one or more register-wheels, 28, the gear-wheel, 42, and a movable carrier therefor, with the detent, 44, for engaging the carrier, the detent-releasing lever, 56, coacting with the said pawl, 58, the rock-shaft, 86, having a lever, one portion or arm of which is subject to impingement by the said cam, 92, an electric circuit comprising said contacts, 96, 92, and an electro-magnetic vibrator which, on the closing of the circuit, becomes operative to rotate the disk-shaft, all substantially as and for the purposes set forth.

4. In a cash indicating and registering machine, the combination with a registering wheel shaft, 24, having thereon a series of registering wheels, 28, 28, with variable numbers of teeth and with plain peripheral portions, of a series of movable supports and gear-wheels in said supports, means for holding said supports with their gear-wheels clear from the register-wheels, 28, key-actuated devices for releasing the supports to permit the gears to be moved into meshing engagement with said register-wheels, and means for then causing automatically, the rotation of the register-wheel shaft, substantially as described.

5. In a cash registering machine, in combination, the key-levers, the rods, 60, with the jointed hook-members, 65, to engage the swung keys and having the studs, 66, the register wheels, 28, 28, and the movable supports, 41, 41, having the gears, 42, therein, the detents, 44, engaging and holding up the said supports, the detent releasing levers, 56, and the pawls, 58, jointed upon the said rods, 60, movable supports for holding a rod, 60, when elevated by a key, temporarily raised, means for causing the said supports to be so moved as to permit the descent of the rods, 60, in conjunction with the return movement of the key-lever, mechanism actuated by, and in conjunction with, the return movement of the key-levers for disengaging the hook members, 65, from the key-levers, and the retracting springs, 61, applied to said rods, 60, substantially as described.

6. In a cash registering machine, the combination with the key-levers having the pins, 18, of the rods, 60, 60, having the depending pivoted hooks, 65, the rock-shaft, 180, with the dogs, 182, 182, coacting with the said pivoted hooks, 65, the arm, 186, of said rock-shaft, the lever, 190, with the jointed extremity, the link, 188, connecting arm, 186, and lever, 28, and a rotary reciprocatory register wheel, 190, having the pin, 194, which trips the said lever, 190, substantially as and for the purpose set forth.

7. In a cash registering machine, in combination, the key-levers and universal-bar, 22, with the arm, 132, the rotary reciprocatory shaft with registering wheels, 28, and the loosely mounted sprocket-wheel, 122, the cash drawer, and two sprocket-wheels, 136 and 137, with the chain, 138, around said wheels which is provided with one or more projections, 142, which are adapted to engage the drawer, a sprocket-chain around the sprocket-wheel, 122, and having a driving engagement with the arbor of the sprocket-wheel, 136, an offset arm, 124, on said sprocket-wheel, 122, carrying the pivoted pawl, 127, a pin, 130, on one of said registering wheels adapted to engage and force around the said pawl, 127, on the occasion of its being brought to position therefor by being swung by said arm, 132, substantially as described.

8. In a cash registering machine, the combination with a reciprocatory key and a rotary reciprocatory shaft having registering wheels thereon, and an electric motor having a gear connection therewith, a contact, 210, in the motor circuit and a lever, D, having a member thereof provided with a contact, 208, also in the motor circuit, and a member on the key for swinging the lever, D, to place its contact, 208, against the contact, 210, on the return of the key to its normal position, substantially as described.

9. In a cash registering machine, the combination with a reciprocatory key and a rotary reciprocatory shaft having registering wheels thereon, and an electric motor having a gear connection therewith, a contact, 210, in the motor circuit, and a lever, D, having a member thereof provided with a contact, 208, also in the motor circuit, and a member on the key for swinging the lever, D, to place its contact, 208, against the contact, 210, on the return of the key to its normal position, a spring for causing a reversed rotation of the register wheel shaft, and means intervening between the register wheel shaft and said contact carrying lever for restoring the lever to its normal position with its contact, 208, removed from said contact, 210, substantially as described.

10. In a cash registering machine, the combination with the key, a registering wheel mounted for a rotary reciprocatory movement, a compound lever, one member of which is adapted to be tripped by the return movement of the key, and said compound lever consisting of the lever 200 and the lever, 202, with the auxiliary lever, 214, the motor and motor circuit comprising the contact, 210, and the contact, 208, carried by lever, 200, the pin, 216, merely overlying the auxiliary lever, 214, the fixed pin, 218, underlying both lever members, 214 and 202, a pin on the registering wheel extending across the thickness and engaging both of the said lever members, driving connections between the motor and the registering wheel, and the spring, 215, for effecting the return rotation of the register-wheel after having been forwardly driven by the motor, substantially as described.

11. In a cash registering machine, the combination of shaft, 24, register wheels, 28, having variable teeth and one or more thereof having an untoothed peripheral portion, carriers with gear wheels which are comprised in registering mechanisms, which carriers are movable to permit the gears carried thereby to drop to engagement with the teeth of the register-wheels, 28, or to be by the plain, peripheral portions moved out of the path of the teeth, detents, 44, for restraining the carriers, 41, from moving into the gear engagements, keys and mechanism actuated thereby and intervening between same and the detents, 44, for effecting the disengagement of the detents from the gear carriers, substantially as and for the purposes set forth.

12. In a cash registering machine, the combination with a key-lever and a key-post at the forward end thereof having on its side the series of ratchet-teeth, the upper tooth of the series being extended and having the cam, 27, at the bottom of the series, of the pivoted pawl adapted to engage said ratchet-teeth and to be impinged upon by said extended tooth and said cam, at the ends of the strokes of the key, substantially as described.

13. In a cash registering machine, the combination with a key-lever and a key-post at the forward end thereof having on its side the series of ratchet teeth, the upper tooth of the series being extended and having the cam, 27, at the bottom of the series, of the pivoted pawl adapted to engage said ratchet teeth and to be impinged upon by said extended tooth and said cam, at the ends of the strokes of the key, and having the notched projection, 33, and the click-detent coacting with the said notched projection, substantially as described.

14. In a cash registering machine, a series of keys, the universal bar actuated by any of the keys, and the shaft, 24, having thereon a series of wheels comprised in the registering mechanism, a series of bars, 60, having the pins, 66, and the cams, 60*, the shaft, 62, having the disks thereon each with the slot therein, the rock-shaft having the series of dogs, 88, to coact with the aforesaid cams, and having the arm, 90, carrying a contact-piece, a contact-piece on the universal bar, an electro-magnetic vibrator comprised in a circuit which includes said contact-pieces, and which operates, on the closing of the circuit as insured by the depression of a key, to rotate the disk-shaft, an electric motor comprised in a circuit, one removable contact of which is operated and closed by the key in its return movement, as permitted by the previous operation of the vibrator, substantially as described.

15. In a cash registering machine, the combination with the cash drawer and the locking-bolt therefor having the stud, 156, of a wheel, 137, mounted for rotation adjacent the bolt and having a projection, 158, to engage the said bolt-stud, and a register-wheel-shaft and a medium of connection between it and said wheel, 137, whereby on the rotation of the register-wheel-shaft, the said bolt-operating wheel will be rotated, substantially as described.

16. In a cash registering machine, the combination with the cash drawer, the locking bolt therefor and means for drawing the bolt on the operation of the register, of the pair of sprocket wheels, 136, 137, the sprocket-chain, 138, running around said wheels, and having the projections, 140, 142, which are adapted to have forwardly forcing engagements against the cash drawer, and means for drawing the bolt and imparting a progressive movement to the sprocket chain upon the operation of the cash register, substantially as described.

17. In a cash registering machine, the combination with the registering wheel shaft, the cash drawer, the locking bolt, 152, having the stud, 156, and the sprocket wheels, 136 and 137, the latter having the stud, 158, to engage bolt-stud, 156, the sprocket-chain, 138 having the projections, 140, 142, to cooperate with the drawer, and the sprocket-chain driven by the register-wheel-shaft and driving said sprocket-wheels, all substantially as and for the purposes set forth.

WILLIAM A. DOBSON.

Witnesses:
WM. S. BELLOWS,
K. I. CLEMONS.